US009244891B2

(12) United States Patent
Cierniak et al.

(10) Patent No.: US 9,244,891 B2
(45) Date of Patent: *Jan. 26, 2016

(54) ADJUSTING SEARCH RESULT RANKINGS BASED ON MULTIPLE USER HIGHLIGHTING OF DOCUMENTS

(71) Applicant: Google Inc., Mountain View, CA (US)

(72) Inventors: Michal Cierniak, Palo Alto, CA (US); Michael Stoppelman, San Francisco, CA (US); Benedict A. Gomes, Mountain View, CA (US); Corin Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/045,029

(22) Filed: Oct. 3, 2013

(65) Prior Publication Data

US 2015/0169501 A1 Jun. 18, 2015

Related U.S. Application Data

(63) Continuation of application No. 13/801,020, filed on Mar. 13, 2013, which is a continuation of application No. 11/669,750, filed on Jan. 31, 2007, now Pat. No. 8,595,619.

(51) Int. Cl.
*G06F 17/21* (2006.01)
*G06F 17/30* (2006.01)

(52) U.S. Cl.
CPC ........ *G06F 17/211* (2013.01); *G06F 17/30696* (2013.01); *G06F 17/30864* (2013.01)

(58) Field of Classification Search
CPC ................... G06F 17/30696; G06F 17/30864
See application file for complete search history.

(56) References Cited

U.S. PATENT DOCUMENTS

| 5,838,323 | A | 11/1998 | Rose et al. |
| 6,766,287 | B1 | 7/2004 | Kupiec et al. |
| 6,839,702 | B1 | 1/2005 | Patel et al. |
| 7,797,643 | B1 | 9/2010 | Jobs et al. |
| 2005/0278314 | A1 | 12/2005 | Buchheit |
| 2006/0048046 | A1 | 3/2006 | Joshi et al. |
| 2007/0234209 | A1 | 10/2007 | Williams |
| 2008/0005101 | A1 | 1/2008 | Chandra |
| 2008/0005664 | A1 | 1/2008 | Chandra |

OTHER PUBLICATIONS

Patrick Philipolt; "Where Did I Read That", www.pcmag.com; Apr. 9, 2002; 13 pages.
Jakob Nielsen's; "F-Shaped Paltern for Reading Web Content"; www.useit.com, Apr. 17, 2006; 3pages.
Jeffrey Palm; Firefox Add-ons; GDirections:: Mozilla Add-ons; https://addons.mozilla.ora/firefox/1104; Apr. 9, 2006; 3 pages.
Firefox Add-ons; Free eBook Search:: Mozilla Add-ons; https://addons.mozilla.org/firefox/1987, Jul. 12, 2006; 3 pages.

(Continued)

Primary Examiner — Scott Baderman
Assistant Examiner — Asher Kells
(74) Attorney, Agent, or Firm — Fish & Richardson P.C.

(57) ABSTRACT

A system may aggregate highlighting information associated with a document that includes a number of elements. The highlighting information may identify one or more of the elements that have been highlighted by a group of users. The system may determine weight values for the one or more elements, generate information associated with the document based on the weight values, and provide the information.

15 Claims, 20 Drawing Sheets

(56) References Cited

OTHER PUBLICATIONS

Restriction Requirement issued in U.S. Appl. No. 11/669,750 on Oct. 7, 2011, 7 pages.

Office Action issued in U.S. Appl. No. 11/669,750 on Jan. 30, 2012, 23 pages.

Office Action issued in U.S. Appl. No. 11/669,750 on Jul. 31, 2012, 19 pages.

Office Action issued in U.S. Appl. No. 11/669,750 on Mar. 28, 2013, 16 pages.

Notice of Allowance issued in U.S. Appl. No. 11/669,751 on Jun. 24, 2013, 10 pages.

Office Action issued in U.S. Appl. No. 13/801,020 on Mar. 16, 2015, 25 pages.

Office Action issued in U.S. Appl. No. 13/801,020 on Jul. 16, 2015, 14 pages.

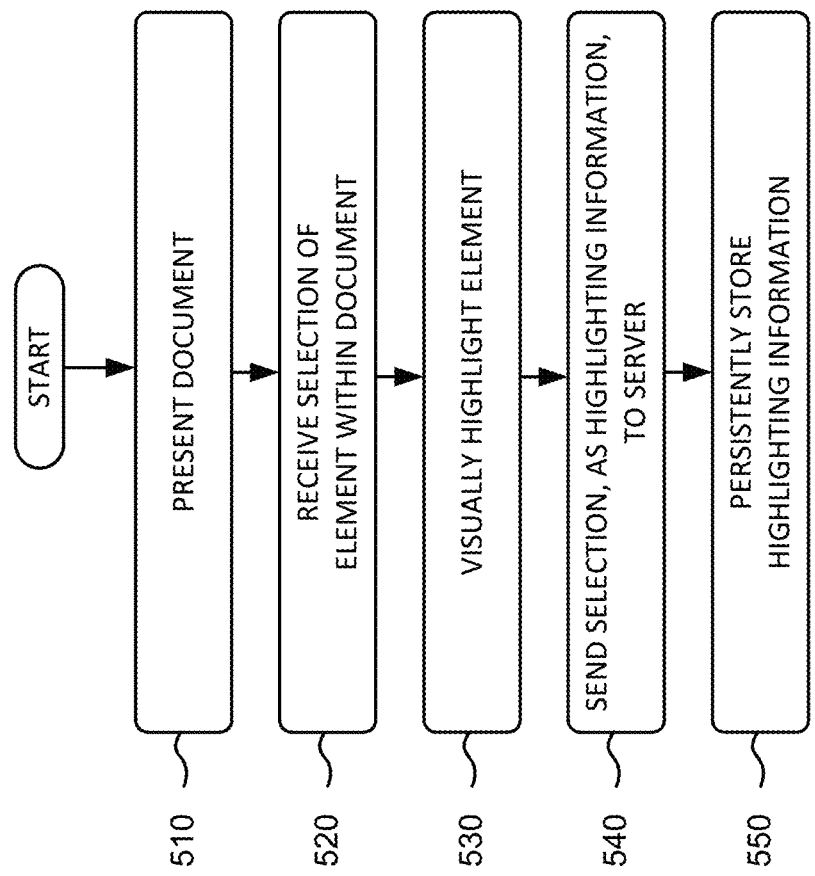

| ELEMENT | WEIGHT |
|---|---|
| ELEMENT 1 | WEIGHT 1 |
| ELEMENT 2 | WEIGHT 2 |
| ELEMENT 3 | WEIGHT 3 |
| ELEMENT 4 | WEIGHT 4 |
| ... | ... |
| ELEMENT N | WEIGHT N |

FIG. 9

| ELEMENT | WEIGHT |
|---|---|
| Buffy wakes up to see she was dreaming in class. | 95 |
| It doesn't take too long after waking up the next morning for Buffy and Willow to realize that they can't hear themselves speak, let alone each other. | 92 |
| It doesn't take too long after waking up the next morning for Buffy and Willow to realize that they can't hear themselves speak, let alone each other. A peek out into the hallway reveals that everybody else in the dorm has been affected as well. | 75 |
| Buffy wakes up to see she was dreaming in class. As they're leaving, Riley overhears Buffy and Willow talking about a dream, and then Willow leaves them to talk. Riley inquires about Buffy's dream and then they talk about their plans for the night. Both make up excuses for their real plans. | 58 |
| Buffy | 26 |
| the Gentlemen | 23 |

FIG. 10

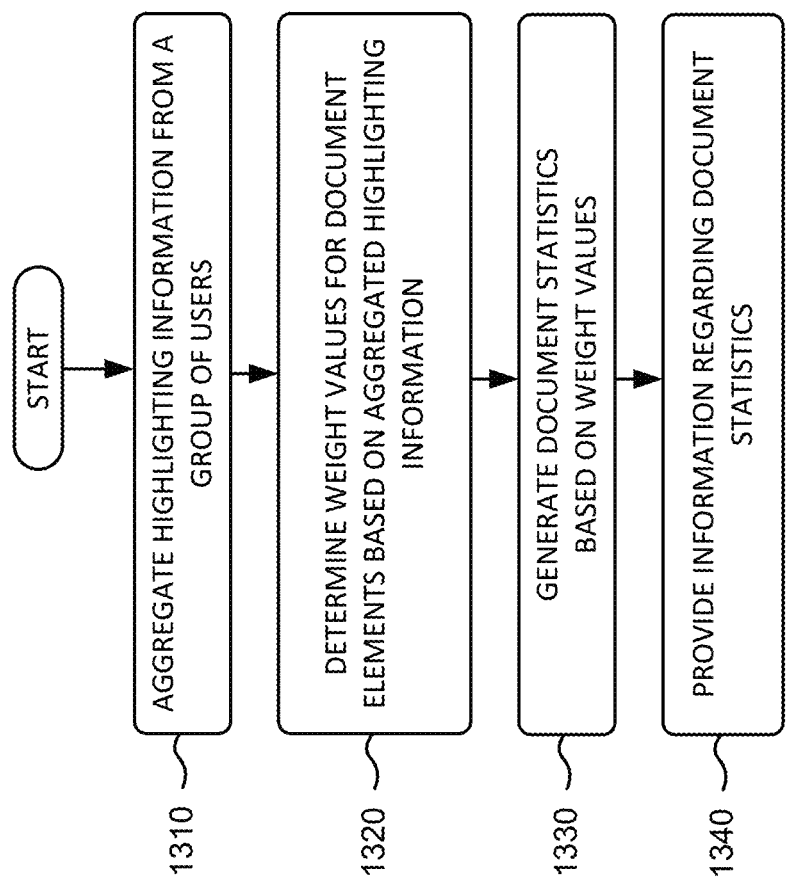

ADJUSTING SEARCH RESULT RANKINGS BASED ON MULTIPLE USER HIGHLIGHTING OF DOCUMENTS

CROSS-REFERENCE TO RELATED APPLICATION

This application is a continuation of U.S. application Ser. No. 13/801,020, filed Mar. 13, 2013, which is a continuation of U.S. application Ser. No. 11/669,750, filed Jan. 31, 2007, the entirety of which are hereby incorporated by reference as if fully set forth therein

BACKGROUND

Implementations described herein relate generally to information retrieval and, more particularly, to highlighting of document elements and the use of this information.

The World Wide Web ("web") contains a vast amount of information. Locating a desired portion of the information, however, can be challenging. This problem is compounded because the amount of information on the web and the number of new users inexperienced at web searching are growing rapidly.

Some existing services permit a user to highlight portions of web pages that are of interest to the user. This highlighting can be persistent, such that when the user later accesses those web pages the highlighting is present. The highlighting might permit the user to easily find portions of these web pages that the user previously identified as being of interest, as indicated by the user's previous highlighting.

SUMMARY

According to one aspect, a method may include aggregating highlighting information associated with a document, the document including a number of elements, the highlighting information identifying one or more of the elements that have been highlighted by a group of users; determining weight values for the one or more elements; generating a snippet or a summary for the document using at least one of the one or more elements based on the weight values; and providing the snippet or the summary.

According to another aspect, a system may include an annotation collector, a weight aggregator, and a snippet renderer. The annotation collector may aggregate highlighting information associated with a document, where the document may include a number of elements, and the highlighting information may identify one or more of the elements that have been highlighted by a group of users. The weight aggregator may determine weight values for the one or more elements. The snippet renderer may generate a snippet for the document using at least one of the one or more elements based on the weight values, and provide the snippet.

According to yet another aspect, a system may include a summary renderer that may receive an instruction to present a summary regarding a document, obtain weight values associated with elements within the document, the weight value associated with one of the elements within the document being a function of how many users previously highlighted the one of the elements, generate the summary using at least one of the elements based on the weight values, and provide the summary.

According to a further aspect, a method may include providing a document; detecting marking of an element within the document; highlighting the element based on the marking of the element; and sending information regarding the element for storage in a per-user database and in an aggregate database, where the per-user database stores the information in an entry associated with a user who marked the element, and the aggregate database stores the information in an entry associated with the document.

According to another aspect, a method may include aggregating highlighting information associated with a document, where the document may include a number of elements, and the highlighting information may identify one or more of the elements that have been highlighted by a group of users; determining weight values for the one or more elements; generating document statistics based on the weight values; and providing the document statistics.

According to a further aspect, a system may include means for aggregating highlighting information associated with a document, where the document may include a number of elements, and the highlighting information may identify one or more of the elements that have been highlighted by a group of users. The system may also include means for determining weight values for the one or more elements; means for generating information associated with the document based on the weight values; and means for providing the information.

According to another aspect, a method may include receiving information regarding at least one element that has been highlighted by a user in a document; generating a new address for the document, the generated address identifying a version of the document in which the at least one element is highlighted within the document; and providing the generated address to the user to permit the user to share the document with another user, and/or publishing the document based on the generated address.

According to a further aspect, a method may include receiving information regarding elements that have been highlighted by one or more users within one or more documents; generating an address for a virtual document that is created based on at least one of the elements that has been highlighted in the one or more documents; and providing the generated address to one of the users to permit the one of the users to share the virtual document with another user, and/or publishing the virtual document based on the generated address.

BRIEF DESCRIPTION OF THE DRAWINGS

The accompanying drawings, which are incorporated in and constitute a part of this specification, illustrate one or more embodiments described herein and, together with the description, explain the invention. In the drawings.

FIG. 5 is a flowchart of an exemplary process for storing highlighting information;

FIG. 9 is an exemplary table illustrating weight values that might be determined for elements of a document;

FIG. 10 is an example of a table illustrating weight values that might be determined for elements within an example document;

FIG. 13 is a flowchart of an exemplary process for determining document statistics based on highlighting of document elements.

DETAILED DESCRIPTION

The following detailed description refers to the accompanying drawings. The same reference numbers in different drawings may identify the same or similar elements. Also, the following detailed description does not limit the invention.

Overview

Implementations described herein may facilitate highlighting of document elements. Implementations described herein may also aggregate highlighting from a number of users and use information regarding the aggregated highlighting to generate snippets and/or summaries of documents and/or determine statistics regarding documents. Implementations described herein may further permit highlighting to be shared or published.

Figure 1:
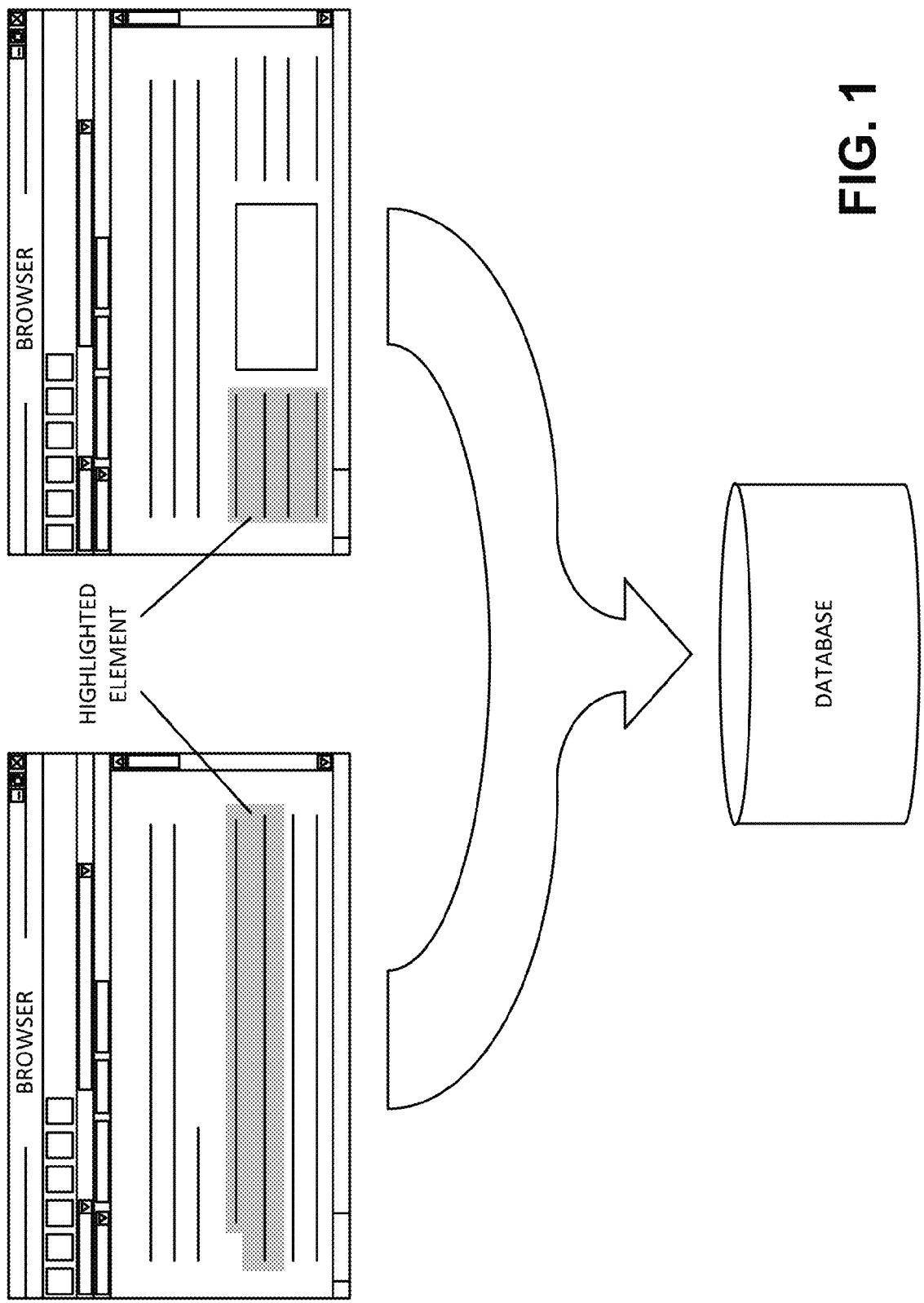
FIG. 1 is an exemplary diagram illustrating a concept described herein.

FIG. 1 is an exemplary diagram illustrating a concept described herein. As shown in FIG. 1, users might highlight elements within documents. The highlighted elements may be aggregated from a number of different users and stored in a database. Information regarding the highlighted elements may be used to generate snippets and/or summaries of documents and/or determine statistics regarding documents.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). An "element," as the term is used herein, is to be broadly interpreted to include any portion of a document. For example, an element might include text of any length, such as a character, a symbol, a word, a phrase, a sentence, a paragraph, or some combination of characters, words, symbols, phrases, sentences, or paragraphs. An element could also include non-text, such as an image. The term "highlighting," as used herein, is to be broadly interpreted to include any visual effect that may be applied to an element. Any technique may be used to render the visual effect.

Exemplary Network Configuration

Figure 2:
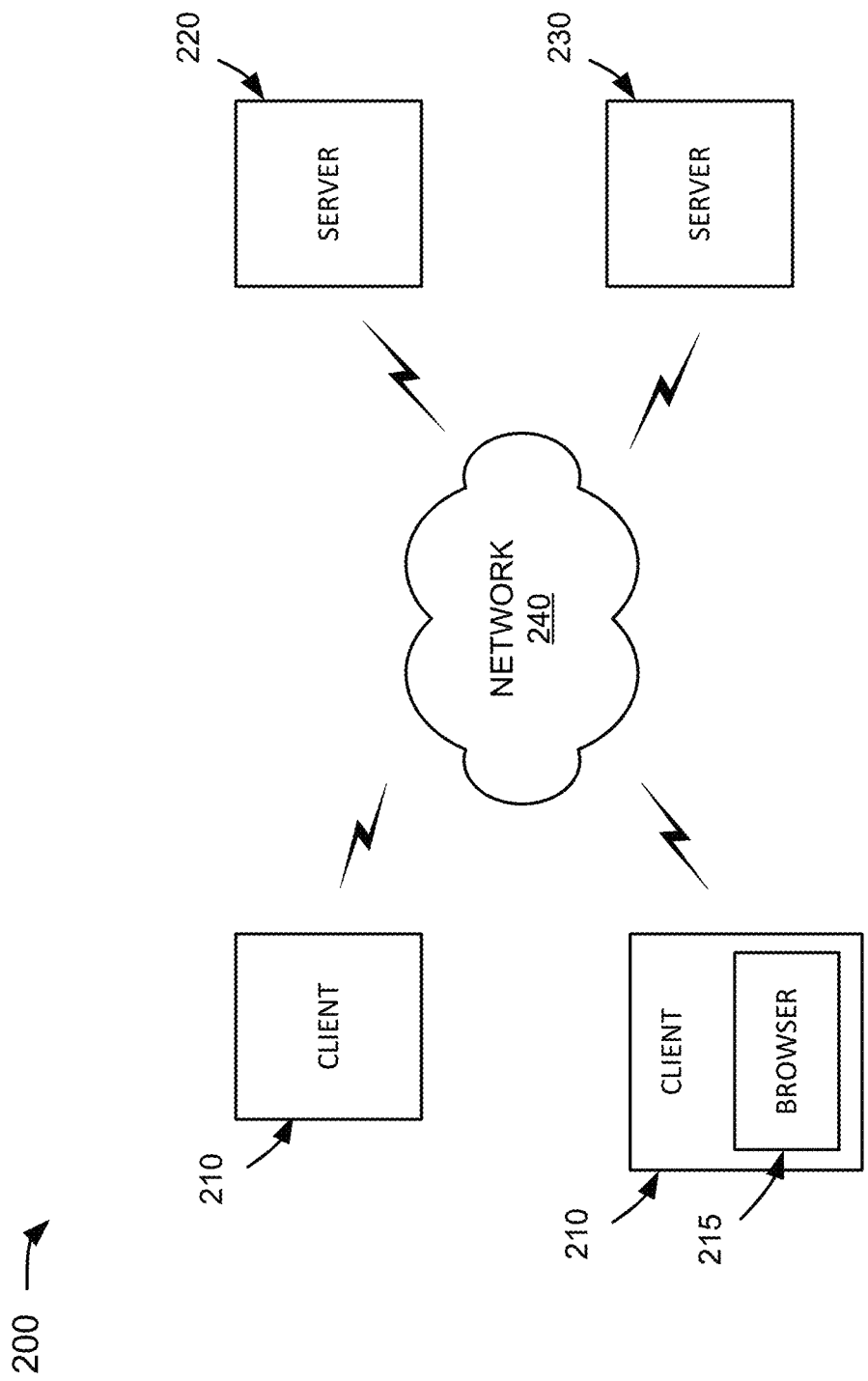
FIG. 2 is an exemplary diagram of a network in which systems and methods described herein may be implemented.

FIG. 2 is an exemplary diagram of a network 200 in which systems and methods described herein may be implemented. Network 200 may include multiple clients 210 connected to servers 220 and 230 via a network 240. Two clients 210 and two servers 220 and 230 have been illustrated as connected to network 240 for simplicity. In practice, there may be more or fewer clients and servers. Also, in some instances, a client may perform a function of a server or a server may perform a function of a client.

Clients 210 may include client entities. An entity may be defined as a device, such as a personal computer, a wireless telephone, a personal digital assistant (PDA), a lap top, or another type of computation or communication device. In one implementation, a client 210 may include a browser 215. Browser 215 may permit a user to access documents and may provide an interface to servers 220 and 230. Browser 215 may include a browser assistant that may take the form of an add-on toolbar or some other functionality that may operate separate from or in conjunction with browser 215. In another implementation, the browser assistant may be integrated as part of browser 215. In some situations, the browser assistant may operate as an interface between browser 215 and network 240.

Servers 220 and 230 may include server entities that gather, process, search, and/or maintain documents. In one implementation, server 220 may aggregate highlighting from a number of clients 210, as described in detail below. Server 230 may store or maintain documents that may be accessed by clients 210. Such documents may include data related to news stories, products, images, user groups, geographic areas, or any other type of data.

While servers 220 and 230 are shown as separate entities, it may be possible for one of server 220 or 230 to perform one or more of the functions of the other one of server 220 or 230. For example, it may be possible for both servers 220 and 230 to be implemented as a single server. It may also be possible for a single one of server 220 or 230 to be implemented as two or more separate (and possibly distributed) devices.

Network 240 may include a local area network (LAN), a wide area network (WAN), a telephone network, such as the Public Switched Telephone Network (PSTN) or a cellular network, an intranet, the Internet, or a combination of networks. Clients 210 and servers 220 and 230 may connect to network 240 via wired and/or wireless connections.

Exemplary Client/Server Architecture

Figure 3:
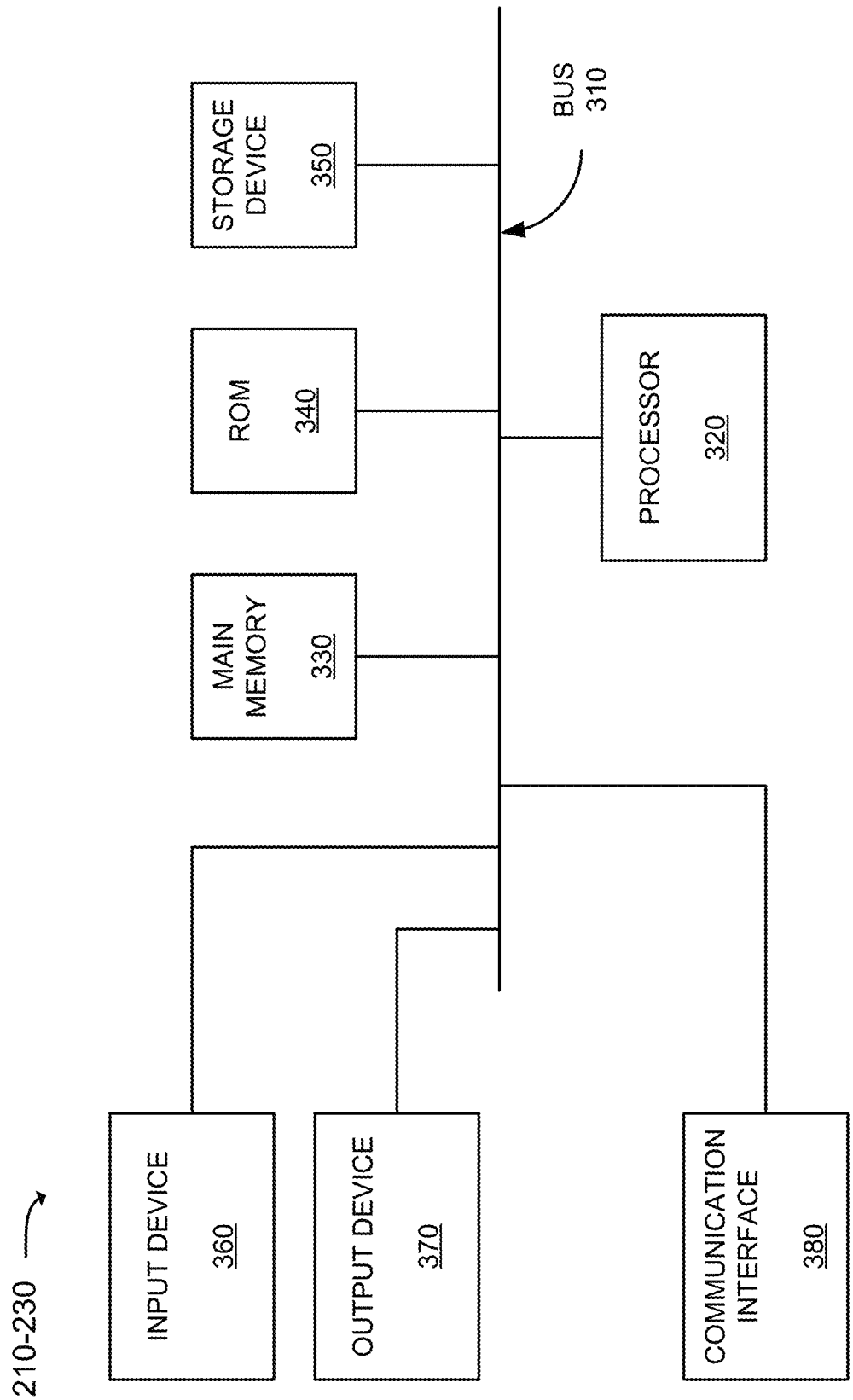
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220 and 230. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

As will be described in detail below, the client/server entity, as described herein, may perform certain operations relating to highlighting of document elements. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
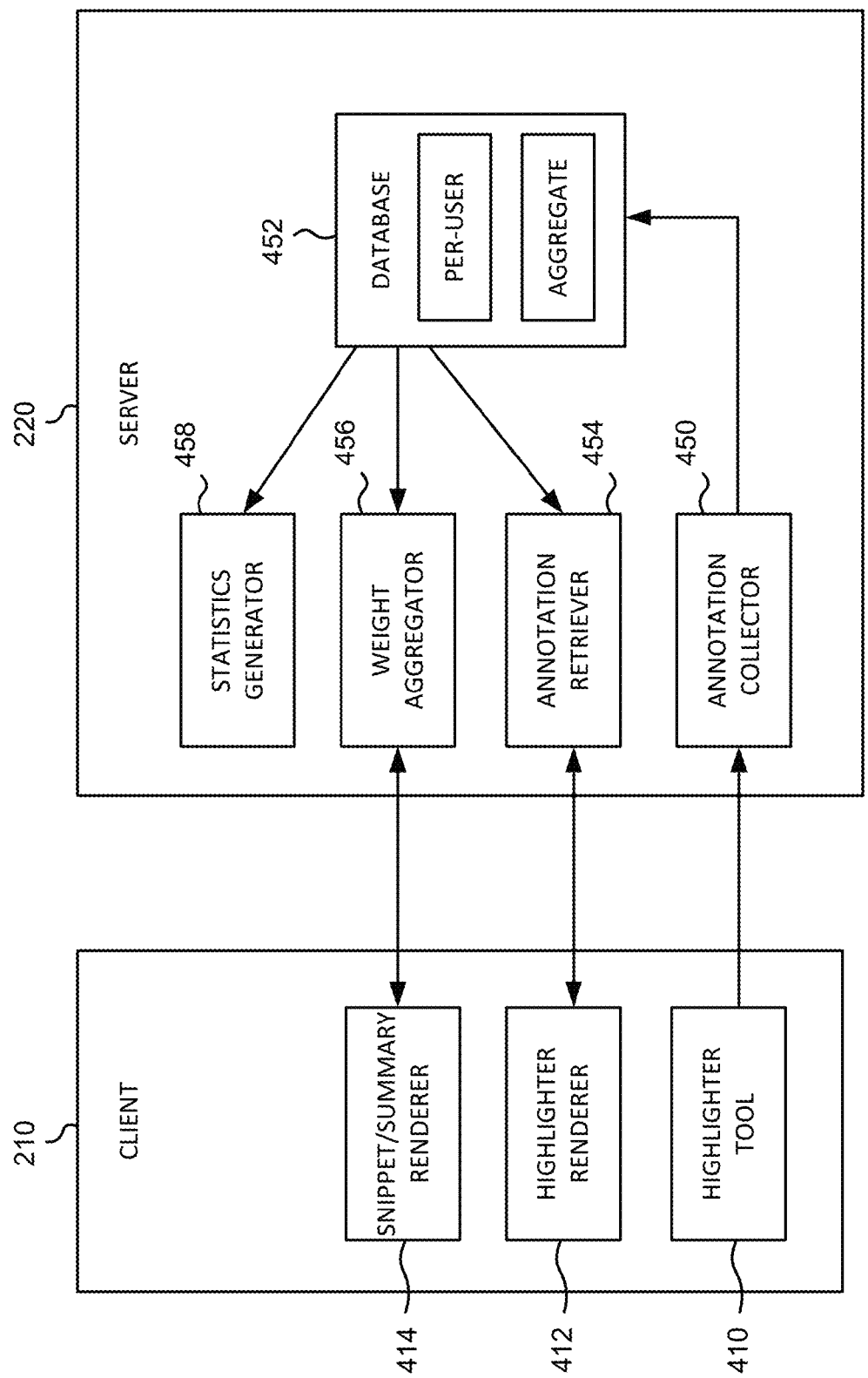
FIG. 4 is an exemplary functional block diagram of a client and server of FIG. 2.

FIG. 4 is a functional block diagram of client 210 and server 220. The functional blocks illustrated in FIG. 4 may be implemented in software, hardware, or a combination of software and hardware on client 210 and/or server 220. While particular functional blocks are shown as being associated with client 210 and other functional blocks are shown as being associated with server 220, any of these functional blocks may be implemented in client 210, server 220, or a combination of client 210 and server 220.

As shown in FIG. 4, client 210 may include a highlighter tool 410, a highlighter renderer 412, and a snippet/summary renderer 414. Server 220 may include an annotation collector 450, a database 452, an annotation retriever 454, a weight aggregator 456, and a statistics generator 458. Each of these functional blocks will be generally described and then described later in more detail.

Highlighter tool 410 may facilitate highlighting of document elements by a user of client 210. Highlighter tool 410 may send highlighting information regarding the document elements highlighted by the user to annotation collector 450. Annotation collector 450 may gather the highlighting information from highlighter tool 410 and store the highlighting information in database 452.

Database 452 may include a per-user database and an aggregate database. The highlighting information associated with a particular user may be stored in both the per-user database and the aggregate database. An entry in the per-user database may be associated with a particular user and indicate the documents on which the user performed highlighting and the elements in those documents highlighted by the user. An entry in the aggregate database may be associated with a particular document and indicate which elements in the document have been highlighted by one or more users and a weight value associated with each element. The weight value associated with an element may be a function of how many users highlighted that element. In an alternative implementation, weight values may be generated on-the-fly (e.g., when needed) and need not be stored in the aggregate database.

A new address (e.g., a Uniform Resource Locator (URL)) may be generated and associated with a document that contains user highlighting. In one implementation, the new address may correspond to the document with all of the highlighting performed by the user. Alternatively, multiple new addresses may be generated and associated with a document that contains all or a subset of the highlighting performed by the user. For example, an address may be associated with a snapshot of the highlighting at the time that the address was generated. Alternatively, addresses may be generated to show varying degrees of highlighting performed by the user. For example, an address may be associated with highlighting that occurred between two points in time.

In another implementation, the new address may correspond to a virtual document created based on highlighting performed by the user on a group of documents. The highlighted elements in the group of documents can be associated with each other in various ways. For example, labels may be assigned to highlighted elements. In this case, the address may correspond to a virtual document that includes highlighted elements from a group of documents that have been assigned the same label(s).

In yet another implementation, the new address may correspond to a virtual document created based on highlighting performed by a group of users on a group of documents. The highlighted elements in the group of documents can be associated with each other in various ways. For example, highlighted elements may be associated based on labels assigned to the highlighted elements, the content of the highlighted elements (e.g., highlighted elements that relate to the same topic), the time that the highlighted elements were highlighted, and/or other features. In this case, the address may correspond to a virtual document that includes highlighted elements from a group of documents that have been associated in some manner.

In a further implementation, the new address may correspond to a virtual document that includes highlighting performed by a single user or a group of users on a single document or a group of documents and possibly annotations relating to the document(s) and/or the highlighted elements. For example, a user may be permitted to annotate a document and/or a highlighted element. This annotation may be included with the highlighted element in the virtual document corresponding to the new address.

The newly generated address(es) may be stored in the per-user database in association with a particular user or group of users, and/or in the aggregate database in association with a particular document or group of documents. The newly generated address(es) may be used by users to share the corresponding document(s) with other users, or published to subscribing users (e.g., based on the new address(es)).

Annotation retriever 454 may retrieve highlighting information for a document from database 452 and provide the highlighting information to highlighter renderer 412. Highlighter renderer 412 may facilitate the display of highlights when the document is presented on a display of client 210. The highlights displayed for the document may include prior highlights performed only by the user of client 210. Alternatively, or additionally, the highlights displayed for the document may include prior highlights performed by one or more other users. Annotation retriever 454 may publish highlights associated with a particular document, or a set of documents, by the user or a group of users. For example, a user might be permitted to subscribe to a feed (e.g., a Really Simple Syndication (RSS) feed) of highlights to a particular document, or a set of documents, or the user might be permitted to receive highlights to a document while the user is currently accessing the document.

Weight aggregator 456 may gather weight values associated with elements within a document from database 452 and provide the weight values to snippet/summary renderer 414. Snippet/summary renderer 414 may facilitate the flexible display of a snippet and/or summary associated with a document based on the weight values received from weight aggregator 456. The display is "flexible" in the sense that the user may be permitted to control the portion of the document included in the snippet or summary by changing a threshold value that determines which elements, based on the weight values associated with the elements, may be included in the snippet or summary.

Statistics generator 458 may analyze weight values associated with elements within a document in database 452 and generate information regarding how users interacted with the document. This information may generally be referred to as "statistics" regarding the document. The statistics may indicate which portions of the document users indicated were important to them, as reflected by which elements the users highlighted. The statistics might be used by a document designer, operator, or owner to facilitate the design or modification of a document, provide information regarding user traffic, determine where on the document to place advertisements, etc. The statistics might also be used by a search engine provider to adjust search result rankings or facilitate user search profiling. The statistics might also be used by an advertisement provider to facilitate the targeting of advertisements on a document.

Exemplary Processing

FIG. 5 is a flowchart of an exemplary process for storing highlighting information. In one implementation, the processing of FIG. 5 may be performed by one or more software and/or hardware components within client 210, server 220, or a combination of client 210 and server 220. FIGS. 6A-6D are exemplary diagrams illustrating highlighting of a portion of a document.

Processing may begin with presentation of a document (block 510). In one implementation, the document may be presented via a browser window of browser 215 on client 210. The particular document that is presented may include any type or form of document selected in any manner by the user. The user might select the document by entering an address (e.g., URL) into an address box of browser 215 or by selecting a link in a document (e.g., a search result document, a directory, or any document that includes a link to another document).

Selection of an element within the document may be received (block 520). In one implementation, selection of an element includes the act of highlighting that element. The highlighting operation may be performed by highlighter tool 410 on client 210. The highlighting operation can be accomplished in a number of ways.

Figure 6A:
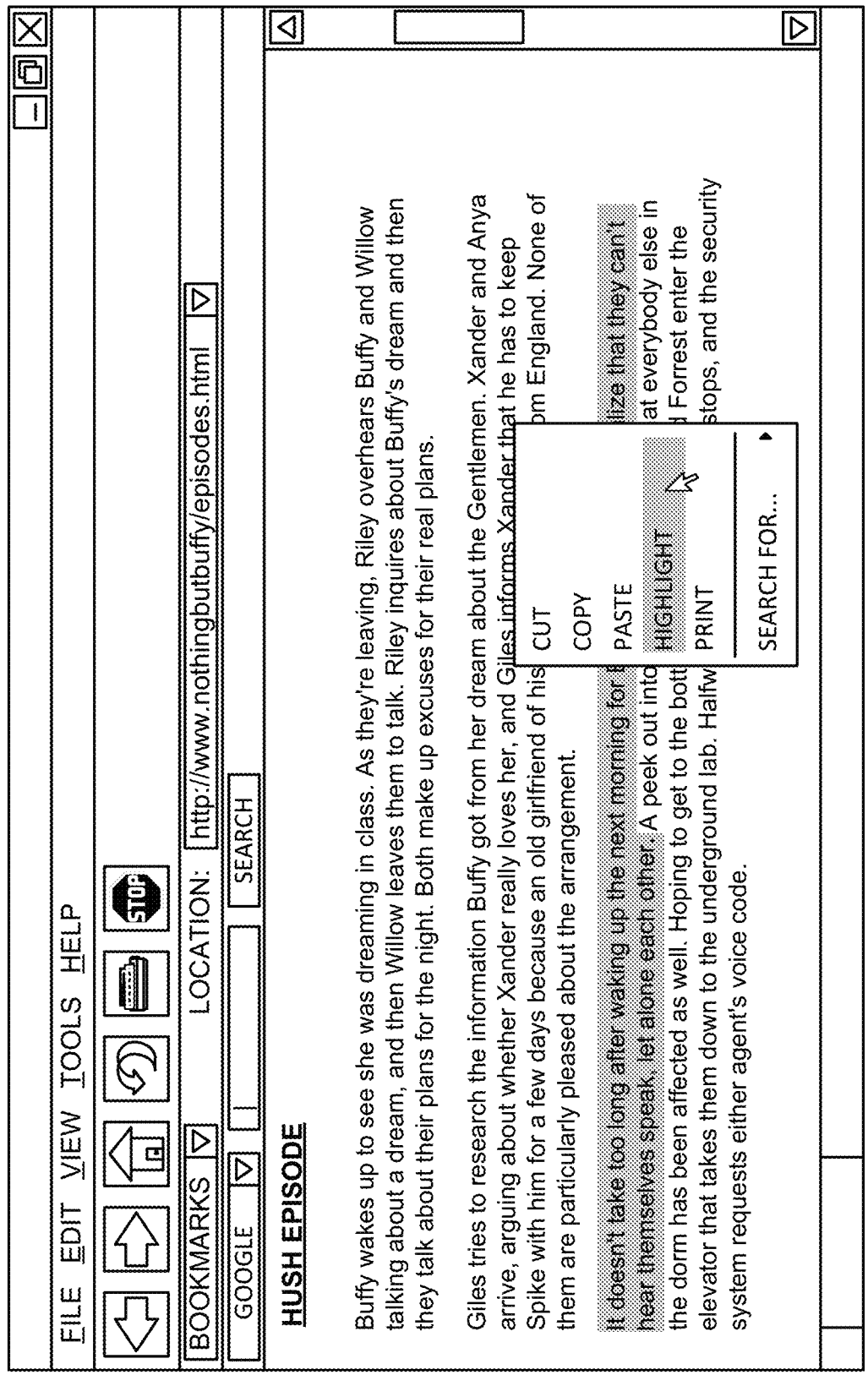
FIGS. 6A-6D are exemplary diagrams illustrating highlighting of a portion of a document.

In one implementation, the highlighting might be accomplished via a right click operation, as shown in FIG. 6A. In this case, a user might mark an element to be highlighted. "Marking" is a built-in operation provided by many browsers. An element is typically marked as a first step of an action. A typical built-in action may include copying the marked element to the clipboard. Another action might include performing a search based on the marked element. After marking the element, the user may right click on the marked element using a pointing device (e.g., a mouse). The right click may cause a menu to be presented. The user may select a menu item corresponding to the highlighting operation. The selection may cause the marked element to be highlighted.

Figure 6B:
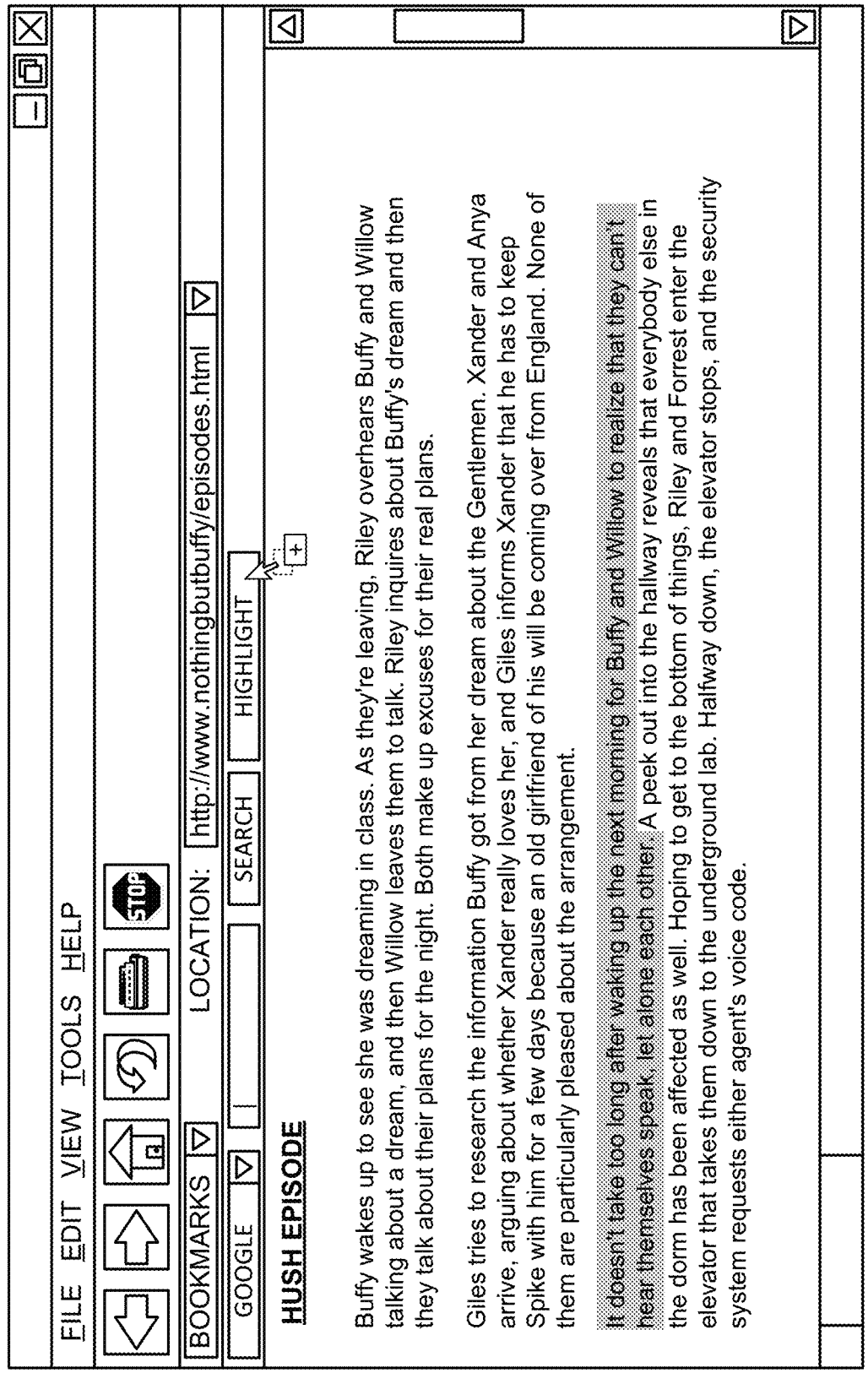

In another implementation, the highlighting might be accomplished via a drag and drop operation, as shown in FIG. 6B. In this case, a user might mark an element to be highlighted. After marking the element, the user may left click on the marked element using a pointing device (e.g., a mouse) and hold the left click, drag the marked element to a button (e.g., the highlight button shown in FIG. 6B), and drop the marked element there (e.g., by releasing the left click). The dropping may cause the marked element to be highlighted.

Figure 6C:
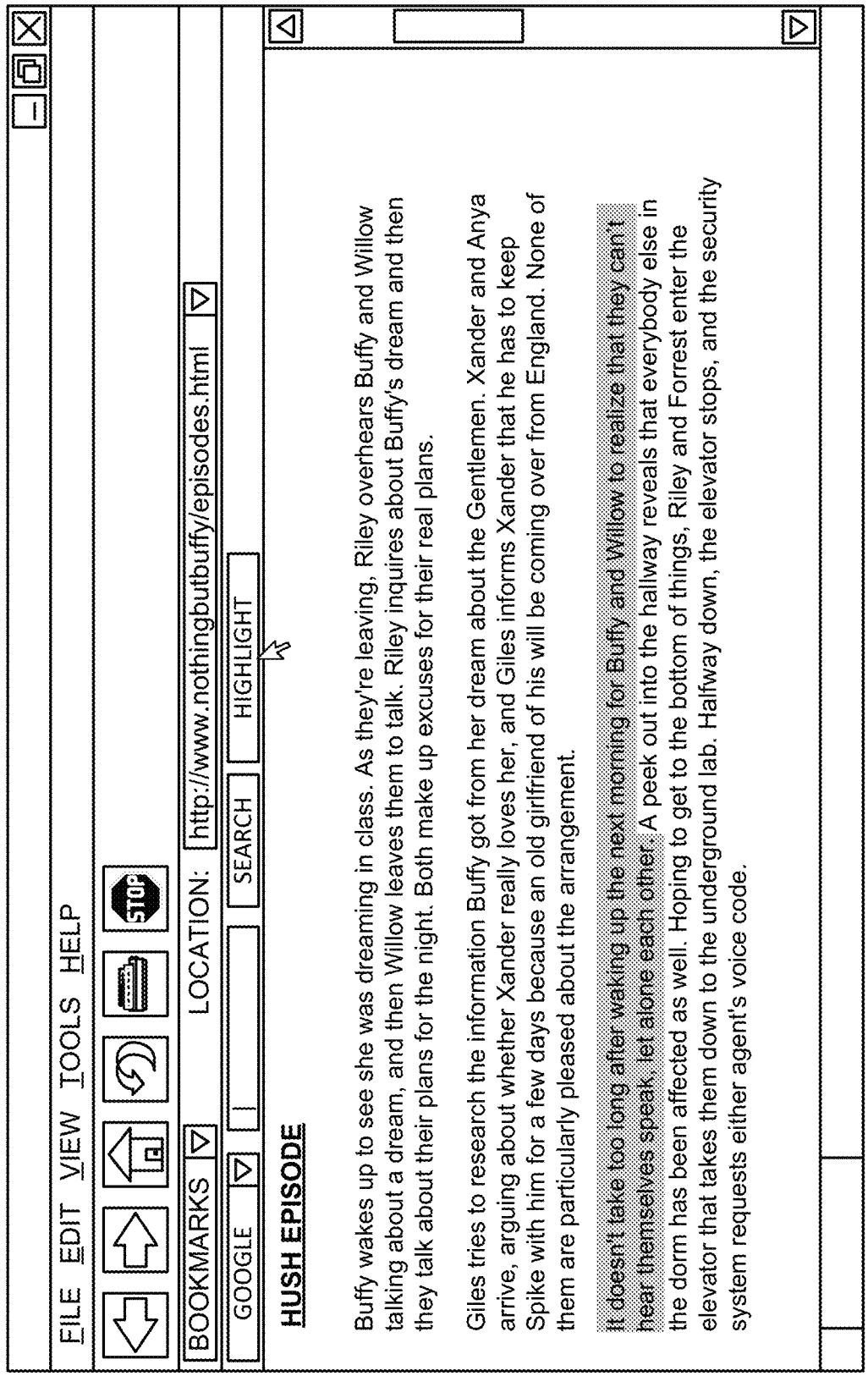

In yet another implementation, the highlighting operation might be accomplished via a button selection, as shown in FIG. 6C. In this case, a user might mark an element to be highlighted. After marking the element, the user may click on a button (e.g., the highlight button shown in FIG. 6C). The clicking on the button may cause the marked element to be highlighted.

Figure 6D:
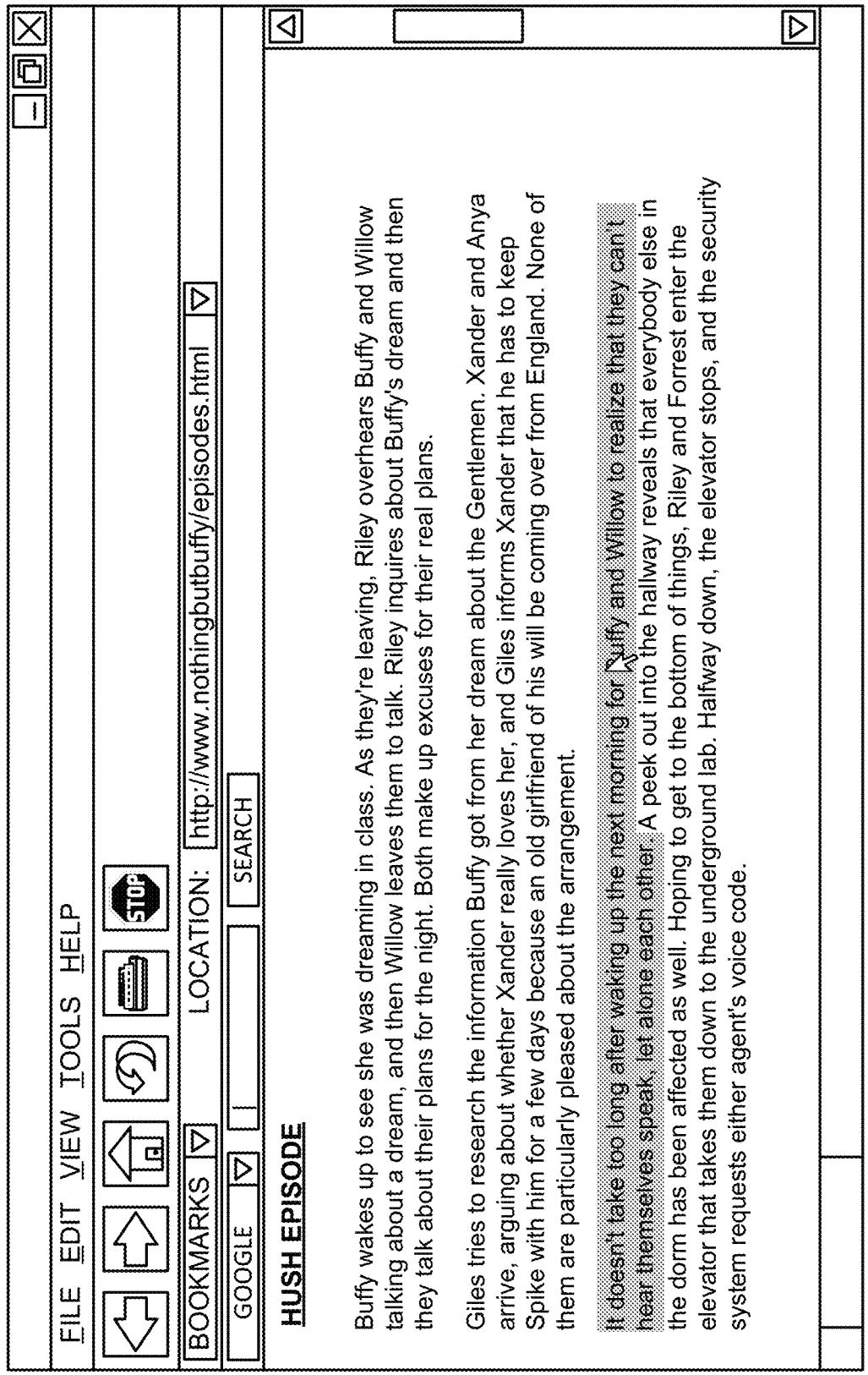

In a further implementation, the highlighting operation might be accomplished via marking, as shown in FIG. 6D. In this case, a user might mark an element to be highlighted. The marking may cause the marked element to be highlighted. In other words, everything marked by a user for any purpose might be automatically highlighted. The advantage of this implementation is simplicity: there is no need to educate users about right-clicking, dragging, etc. There might be an option to switch the automatic highlighting mode on and off (and the default might be off). There might also be an option to undo the highlighting operation.

Returning to FIG. 5, the selected element may be visually highlighted on a display of the document (block 530). Any visual effect can be used to highlight the element. Any technique may be used to render the visual effect.

The element selection may also be sent, as highlighting information, to server 220 (block 540). For example, highlighter tool 410 on client 210 may send the highlighting information to annotation collector 450 on server 220. In one implementation, highlighter tool 410 sends information regarding the user along with the highlighting information. In another implementation, server 220 may recognize the user in another way, such as the user separately logging into server 220.

The highlighting information may be persistently stored (block 550). For example, annotation collector 450 may store the highlighting information in database 452. As explained above, database 452 may include the per-user database and the aggregate database. Annotation collector 450 may store the highlighting information in both databases. For example, annotation collector 450 may store the highlighting information in an entry associated with the user in the per-user database. Annotation collector 450 may generate a new address for the highlighted document and provide the address to the user. This new address may be associated with the entry in the per-user database. The user may share the highlighted document with another user by providing that other user with the new address.

Annotation collector 450 may store the highlighting information in an entry associated with the document in the aggregate database. Annotation collector 450 may increase the weight value associated with the selected element.

Figure 7:
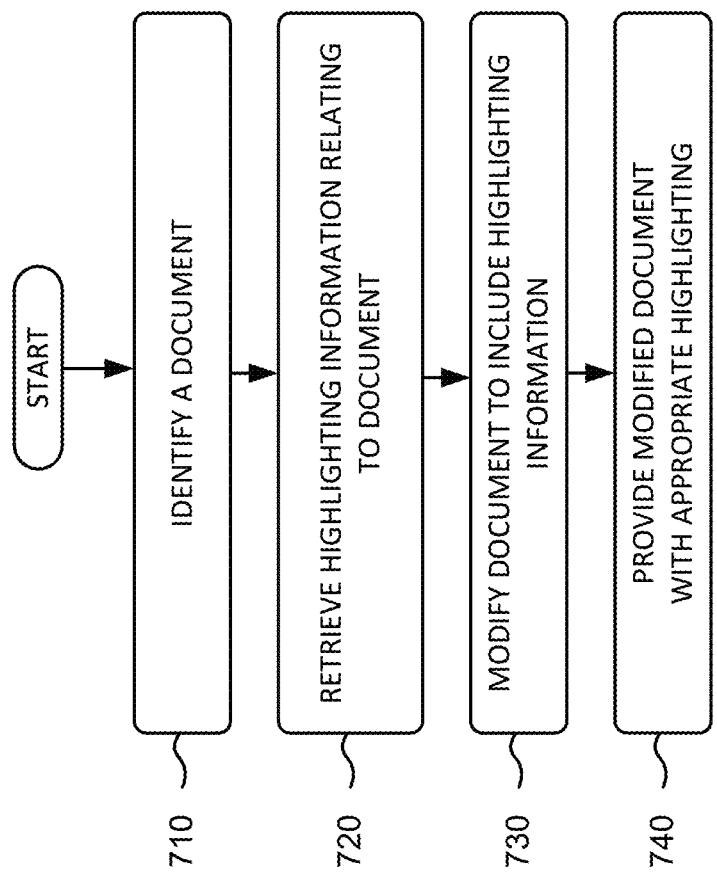
FIG. 7 is a flowchart of an exemplary process for presenting a document with highlighting.

FIG. 7 is a flowchart of an exemplary process for presenting a document with highlighting. In one implementation, the processing of FIG. 7 may be performed by one or more software and/or hardware components within client 210, server 220, or a combination of client 210 and server 220.

Processing may begin with identification of a document (block 710). The particular document that is identified may include any type or form of document selected in any manner by the user. For example, the user might identify the document by entering an address (e.g., URL) into an address box of browser 215 or by selecting a link in a document (e.g., a search result document, a directory, or any document that includes a link to another document).

Highlighting information related to the document, if any, may be retrieved (block 720). For example, highlighter renderer 412 on client 210 may send a request to annotation retriever 454 on server 220. The request may include information regarding the document (e.g., a URL) and information regarding the user. In one implementation, annotation retriever 454 may access the per-user database to retrieve highlighting information for the document that is associated with the user. In another implementation, annotation retriever 454 may access the per-user database to retrieve highlighting information for the document that is associated with another user or a group of users with which the user has been previously associated. In yet another implementation, annotation retriever 454 may access the aggregate database to retrieve highlighting information associated with the document.

The document may be modified to include the highlighting information (block 730). In one implementation, annotation retriever 454 may send the highlighting information to highlighter renderer 412. Highlighter renderer 412 may modify the document to visually highlight the element(s) identified by the highlighting information. When the highlighting information corresponds to more than the user, highlighter renderer 412 may use a different visual effect for highlighting information associated with the different users.

The modified document may be provided with appropriate highlighting (block 740). For example, highlighter renderer 412 may cause the document to be presented on a display of client 210 with the highlighted element(s) visually distinguished in some manner. Any technique may be used to visually distinguish the highlighted element(s). Sometimes a document may be modified after it has been highlighted. In one implementation, all previous highlights may be erased when the document is modified. In another implementation, one or more previous highlights may remain depending on the extent of modification of the document.

A user might obtain information regarding highlights to a document, or a set of documents, in another way. For example, a user might subscribe to highlights associated with a document, or a set of documents, by another user or a group of other users. In this case, annotation retriever 454 may provide a feed that includes information regarding new highlights to a document, or a set of documents. Alternatively, annotation retriever 454 may provide information regarding new highlights to a document currently accessed by a user so that the new highlights can be rendered on the document while the user is accessing the document. In this case, it might be beneficial to give a different visual effect to the new highlights so that the user can identify the new highlights.

Figure 8:
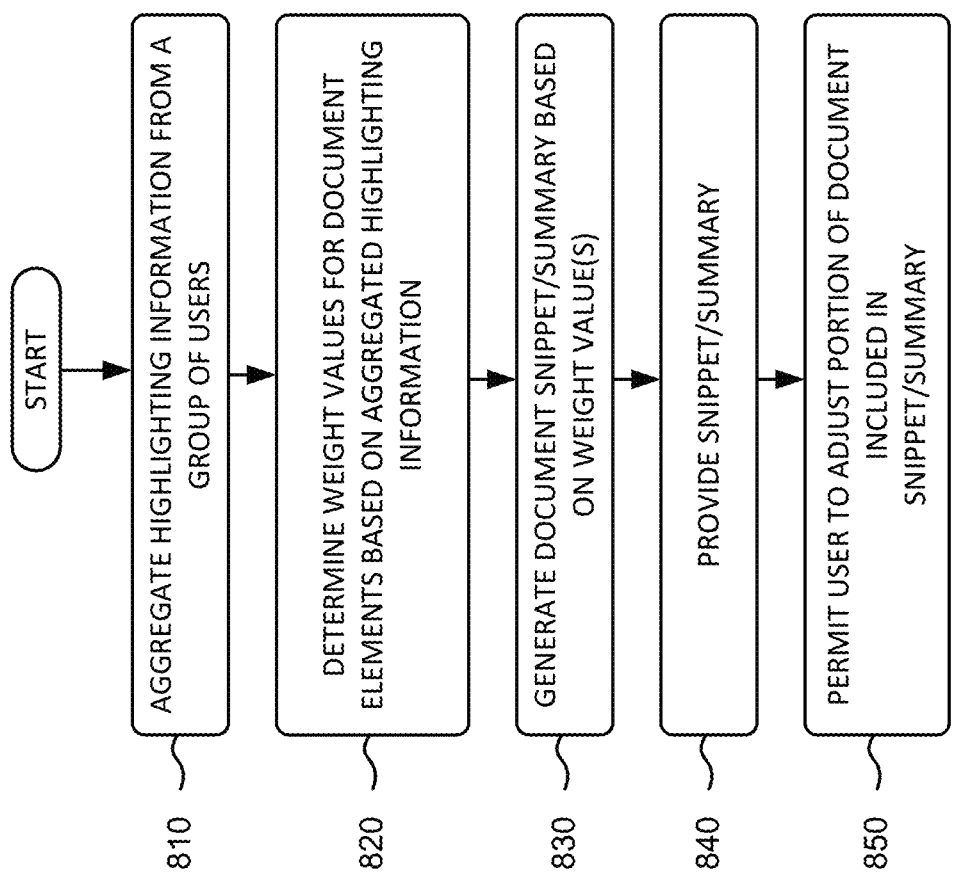
FIG. 8 is a flowchart of an exemplary process for generating a snippet or summary based on highlighting of document elements.

FIG. 8 is a flowchart of an exemplary process for generating a snippet or summary based on highlighting of document elements. In one implementation, the processing of FIG. 8 may be performed by one or more software and/or hardware components within client 210, server 220, or a combination of client 210 and server 220.

Processing may begin with the aggregation of highlighting information from a group of users (block 810). For example, users of clients 210 may use highlighter tool 410 to highlight elements in documents in a manner similar to that described above with regard to FIG. 5. The highlighting information may be stored in the aggregate database of database 452. As described above, an entry in the aggregate database may include highlighting information for a document from a group of users and weight values for elements within the document.

Weight values may be determined for document elements based on the aggregated highlighting information (block 820). A weight value for a document element may be a function of the number of users who highlighted that element. Server 220 may generate or maintain a table for a document that identifies the weight values associated with the elements in that document.

FIG. 9 is an exemplary table illustrating weight values that might be determined for elements of a document. As shown in FIG. 9, the table may include an element field and a weight field. The element field may identify different elements in the document. The weight field may identify a weight value determined for a corresponding element. In one implementation, the weight value may be normalized to fall within a predetermined range (e.g., 0-100, 0-1000, etc.).

Returning to FIG. 8, a document snippet or summary may be generated based on the determined weight value(s) (block 830). For example, elements with weight values above a predetermined threshold may be identified as candidate elements for inclusion in the snippet/summary. The predetermined threshold may be a system default value or a value selected by a user. In one implementation, all of the candidate elements may be included in the snippet/summary. In another implementation, fewer than all of the candidate elements may be included in the snippet/summary. There may be constraints on the size of a snippet or summary. In this case, the snippet/summary may include all or a portion of a candidate element based on the size constraints.

The snippet or summary may be provided (block 840). For example, snippet/summary renderer 414 may obtain information regarding weight values for the elements of a document that may be presented to a user of client 210. In the case of a snippet, snippet/summary renderer 414 may generate or modify the snippet based on the weight values. In the case of a summary, snippet/summary renderer 414 may generate the summary based on the weight values. Snippet/summary renderer 414 may present the generated/modified snippet or the generated summary on a display of client 210.

The user may be permitted to adjust the portion of the document included in the snippet or summary (block 850). For example, snippet/summary renderer 414 may provide a control object by which the user can adjust the threshold used to determine which elements may be identified as candidates for the snippet/summary provided to the user. In one implementation, the control object may take the form of a slider that the user may control to change the threshold and, thus, the length of the snippet/summary. For privacy reasons, an element may need to be highlighted by at least a certain number of users before that element can be considered a candidate element regardless of the threshold set by the user.

To illustrate the processing of FIG. 8, consider the document "Nothing But Buffy," as shown in FIGS. 6A-6D. Assume that users highlighted different elements within that document and that highlighting information associated with the highlighted elements was stored in the aggregate database, in a manner similar to that described above. As shown in FIG. 10, elements of various lengths may include associated weight values that are based on a number of users who highlighted those elements. In the example table of FIG. 10, the weight values may be normalized to fall within a range of 0-100.

In the context of a snippet, assume that a user performed a search for a document containing "buffy hush" that resulted in the Nothing But Buffy document being identified by a search engine. The search engine may form a search result document that includes, for example, a list of snippets. The search engine may return the search result document to client 210. Snippet/summary renderer 414, for example, may intercept the search result document and parse the document to identify the snippets that it contains. Assume that snippet/summary renderer 414 identifies a snippet for the Nothing But Buffy document in the search result document. In this case, snippet/summary renderer 414 may contact weight aggregator 456 to obtain weight values for elements in the Nothing But Buffy document.

Figure 11A:
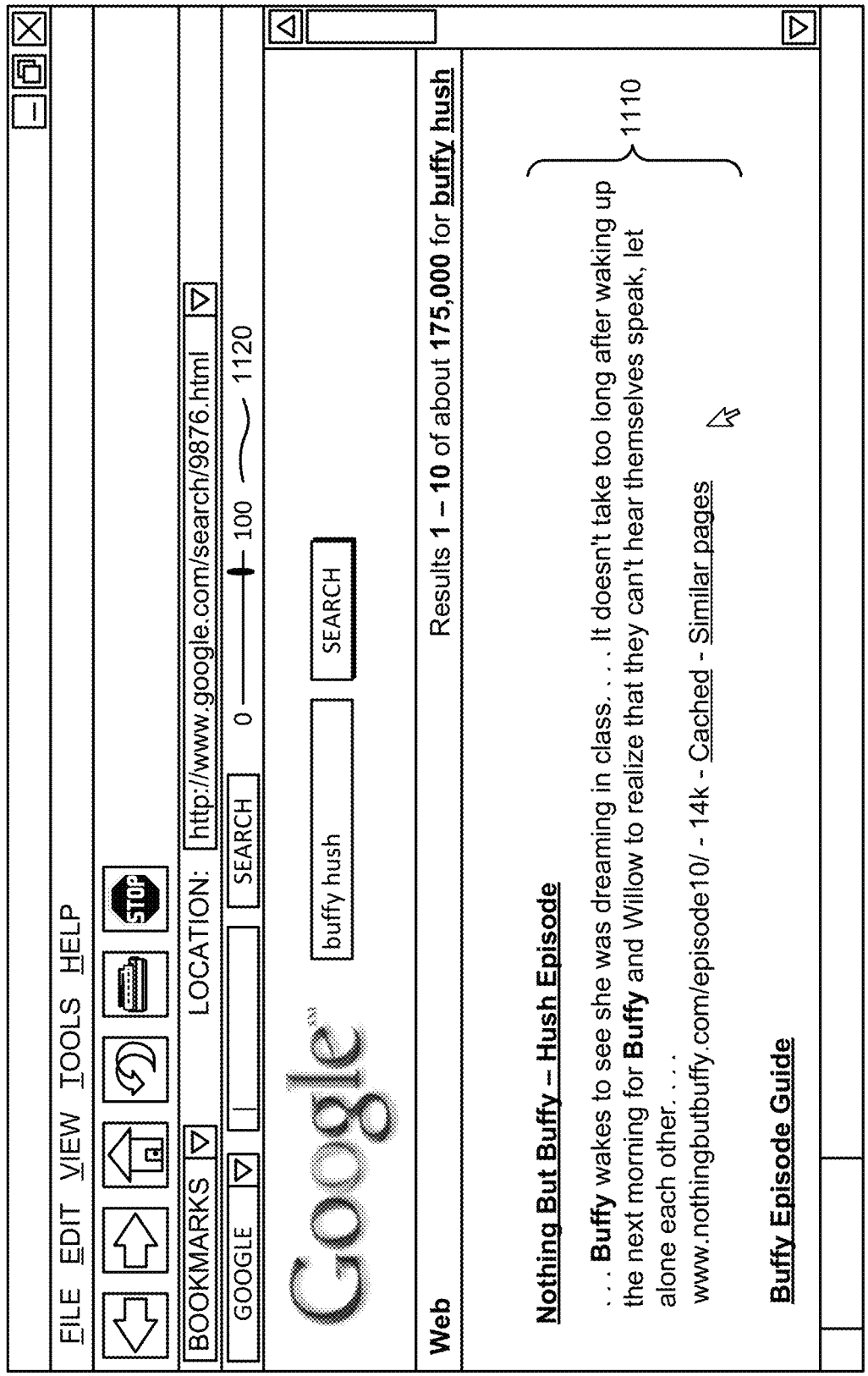
FIGS. 11A and 11B are diagrams illustrating exemplary snippets.

Snippet/summary renderer 414 may modify the Nothing But Buffy snippet in the search result document based on the weight values. For example, assume that the threshold set for the snippet is 90. In this case, the element with a weight value of 95 (FIG. 10) and the element with a weight value of 92 (FIG. 10) may be selected as candidate elements. Snippet/summary renderer 414 may generate a new snippet or modify the existing snippet based on the candidate elements. Snippet/summary renderer 414 may include the snippet, as generated or modified, in the search result document and present the search result document to the user. As shown in FIG. 11A, snippet 1110 for the Nothing But Buffy document includes both of the candidate elements.

Figure 11B:
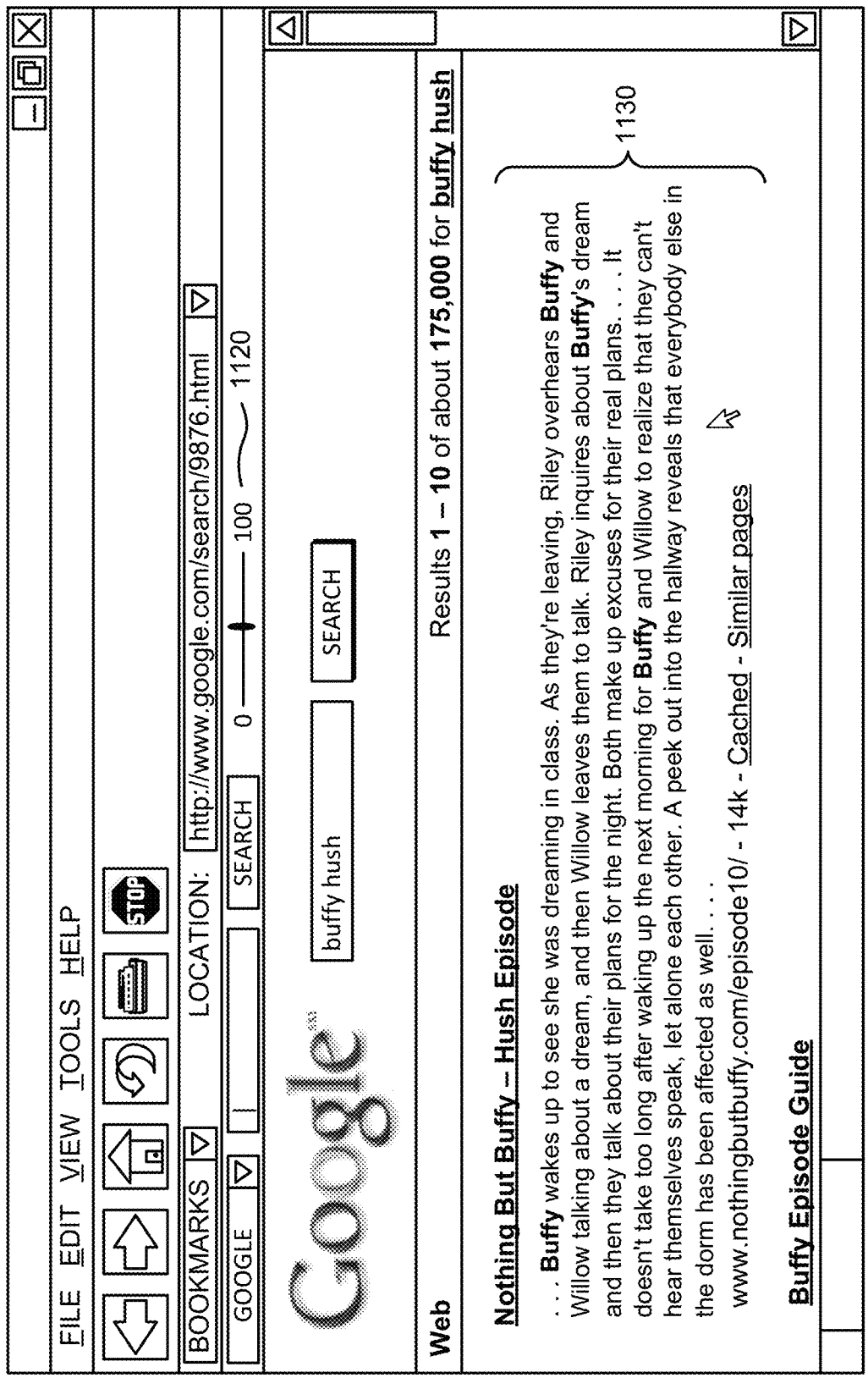

As shown in FIG. 11A, snippet/summary renderer 414 may provide a slider 1120 that may permit the user to adjust the threshold used to determine which elements are identified as candidates for the snippet. As shown in FIG. 11B, assume that the user adjusts slider 1120 to change the threshold from 90 to 50. In this case, the element with a weight value of 95 (FIG. 10), the element with a weight value of 92 (FIG. 10), the element with a weight value of 75 (FIG. 10), and the element with a weight value of 58 (FIG. 10) may be selected as candidate elements. Snippet/summary renderer 414 may generate a new snippet or modify the existing snippet based on the candidate elements. Snippet/summary renderer 414 may include the snippet, as generated or modified, in the search result document and present the search result document to the user. As shown in FIG. 11B, snippet 1130 for the Nothing But Buffy document includes all of the candidate elements.

While it has been described that the search engine forms a search result document and snippet/summary renderer 414 modifies a snippet for a document identified in the search result document based on weight values for elements within that document, this need not be the case. In another implementation, the search engine (which might include snippet/summary renderer 414 in this implementation) may generate the snippets for the documents identified in the search result document based on the weight values for elements within those documents. In this case, snippet/summary renderer 414 may still permit a user to adjust the threshold used to determine which elements are identified as candidates for the snippets.

Figure 12A:
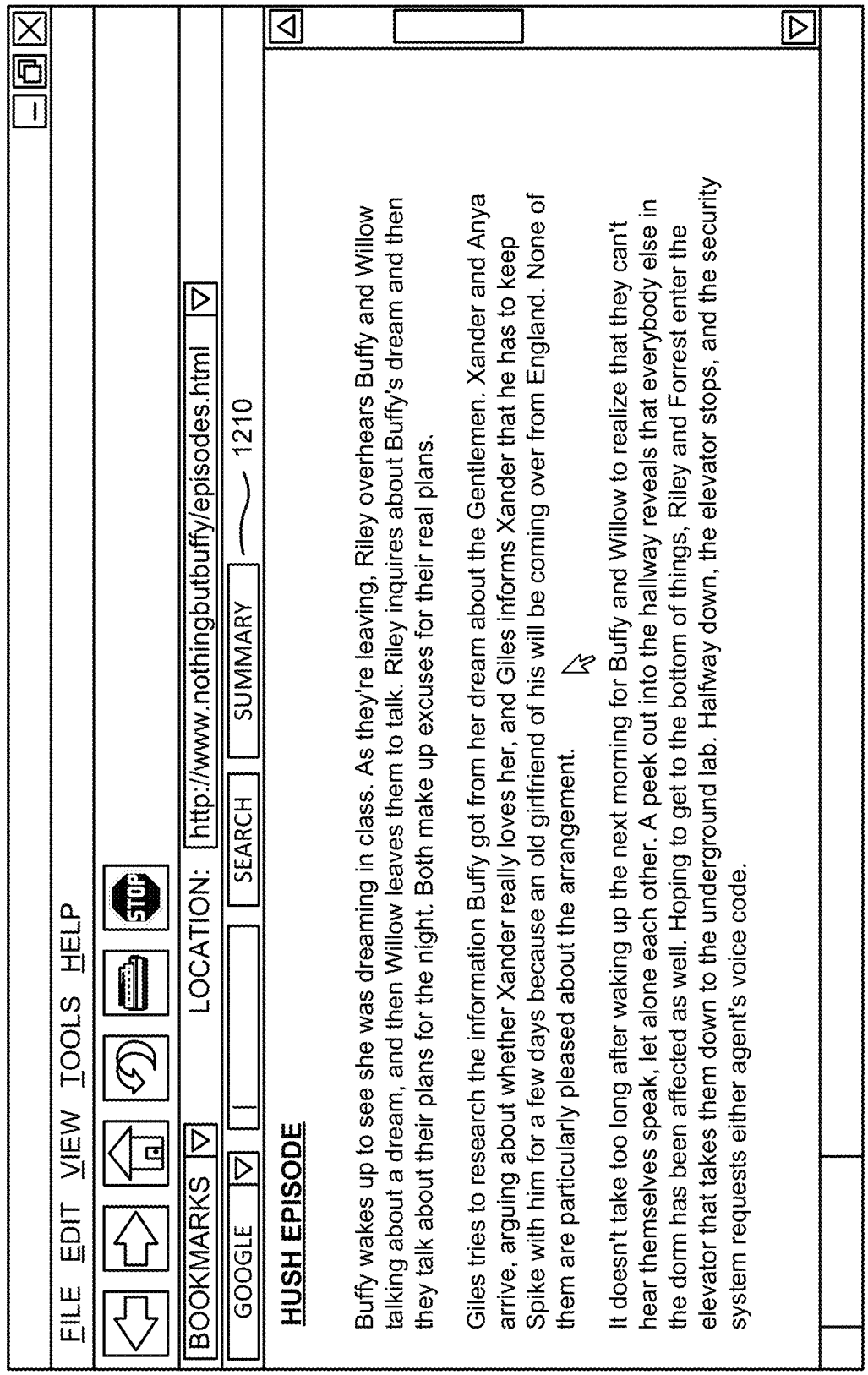
FIGS. 12A-12C are diagrams illustrating exemplary summaries.

In the context of a summary, assume that a user identifies the Nothing But Buffy document based on, for example, a URL or link associated with the document. The Nothing But Buffy document may be presented on a display of client 210, as shown in FIG. 12A. In one implementation, snippet/summary renderer 414 may provide a summary button 1210 that may permit the user to indicate the user's desire for a summary. If the user selects (e.g., clicks on, hovers over, etc.) summary button 1210, snippet/summary renderer 414 may contact weight aggregator 456 to obtain weight values for elements in the Nothing But Buffy document. In another implementation, snippet/summary renderer 414 may identify the user's desire for a summary based on another action by the user within the document or when the document is identified within a search result document.

Figure 12B:
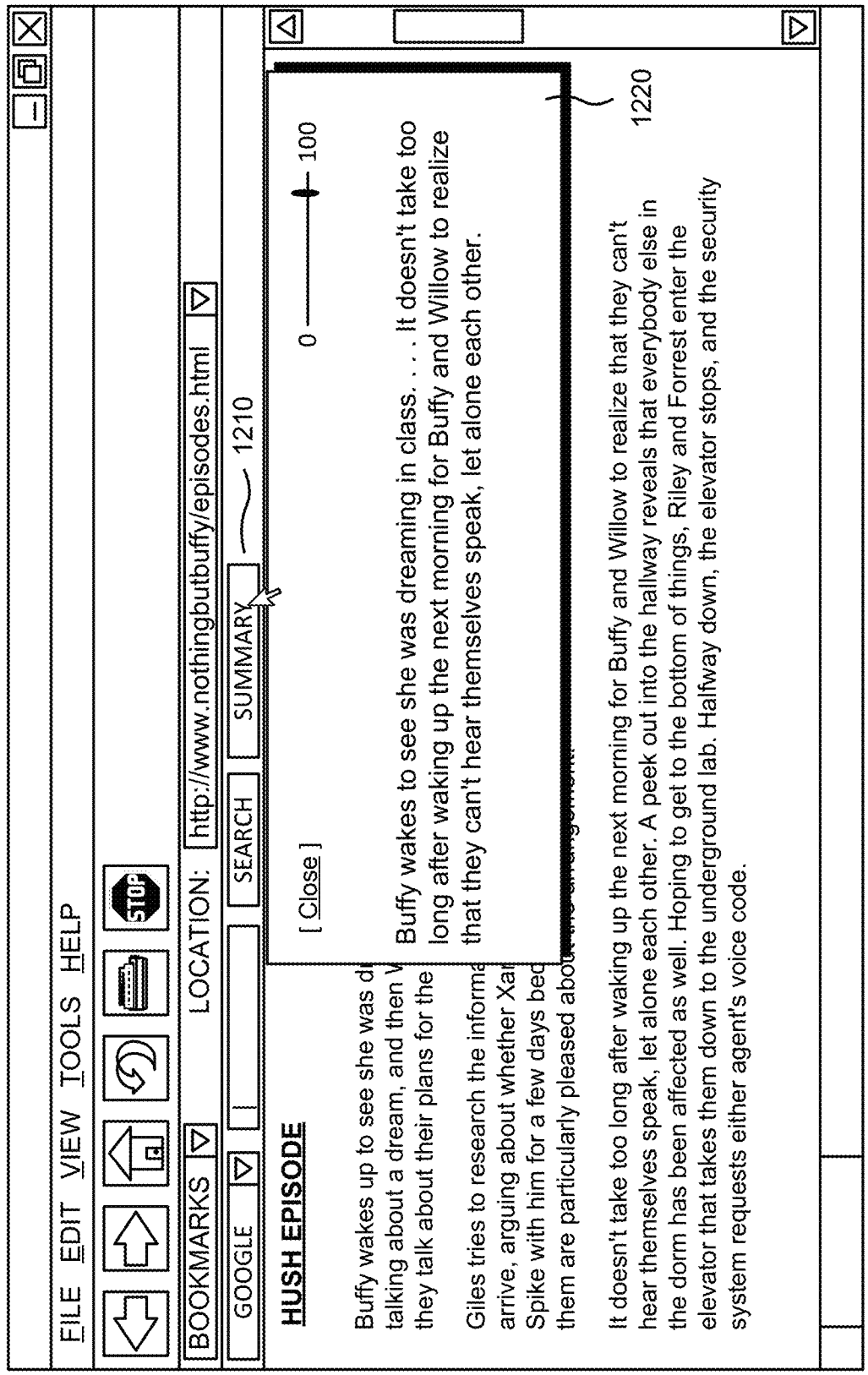

Snippet/summary renderer 414 may generate a summary for the Nothing But Buffy document based on the weight values. For example, assume that the threshold set for the summary is 90. In this case, the element with a weight value of 95 (FIG. 10) and the element with a weight value of 92 (FIG. 10) may be selected as candidate elements. Snippet/summary renderer 414 may generate the summary based on the candidate elements and present the summary to the user. As shown in FIG. 12B, summary 1220 for the Nothing But Buffy document includes both of the candidate elements.

Figure 12C:
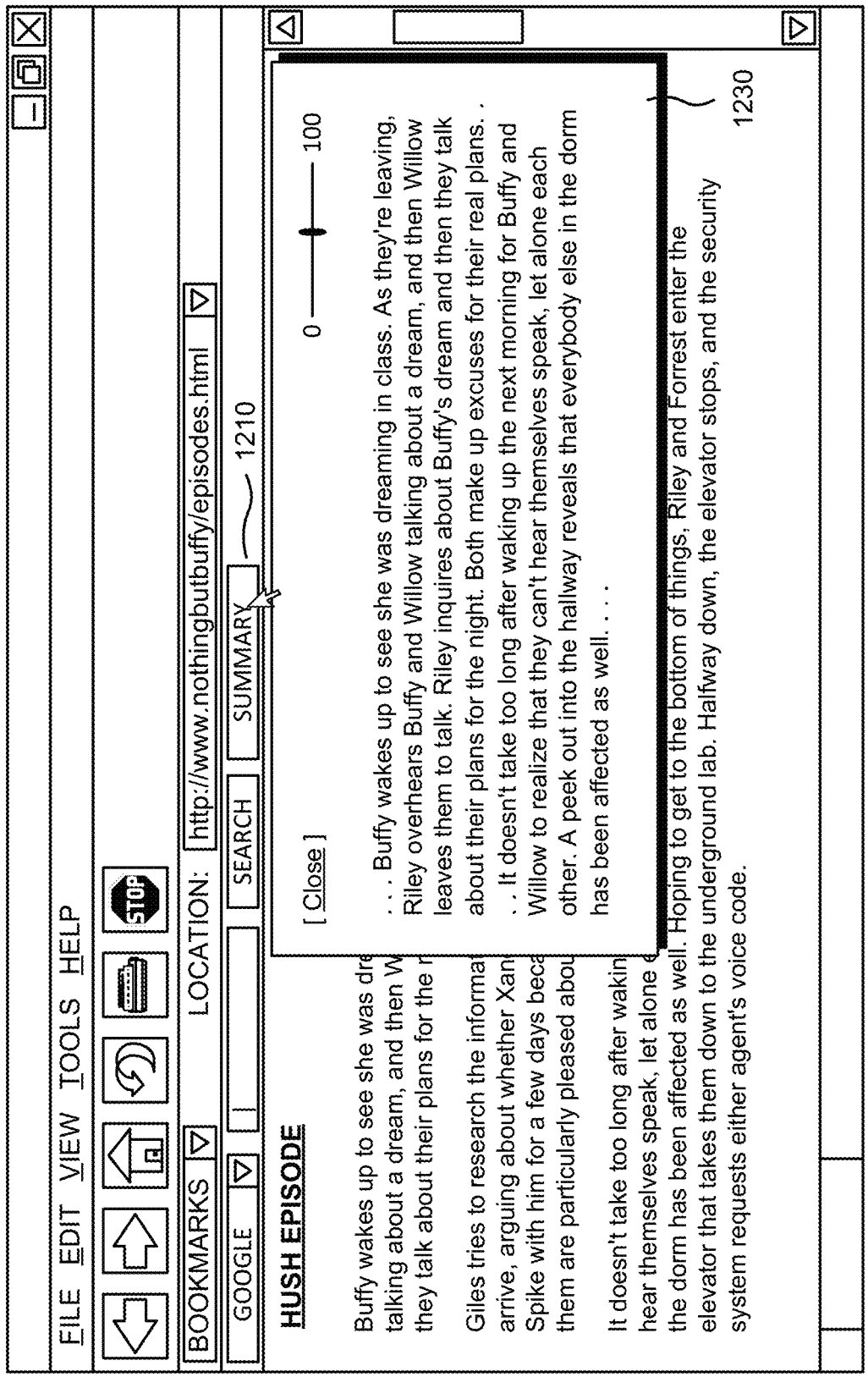

As shown in FIG. 12B, summary 1220 may include a slider that may permit the user to adjust the threshold used to determine which elements are identified as candidates for the summary. As shown in FIG. 12C, assume that the user adjusts the slider to change the threshold from 90 to 50. In this case, the element with a weight value of 95 (FIG. 10), the element with a weight value of 92 (FIG. 10), the element with a weight value of 75 (FIG. 10), and the element with a weight value of 58 (FIG. 10) may be selected as candidate elements. Snippet/summary renderer 414 may generate a new summary or modify the existing summary based on the candidate elements. Snippet/summary renderer 414 may present summary 1230, as generated or modified, to the user, as shown in FIG. 12C. As shown in FIG. 12C, summary 1230 may include all of the candidate elements.

Figure 14:
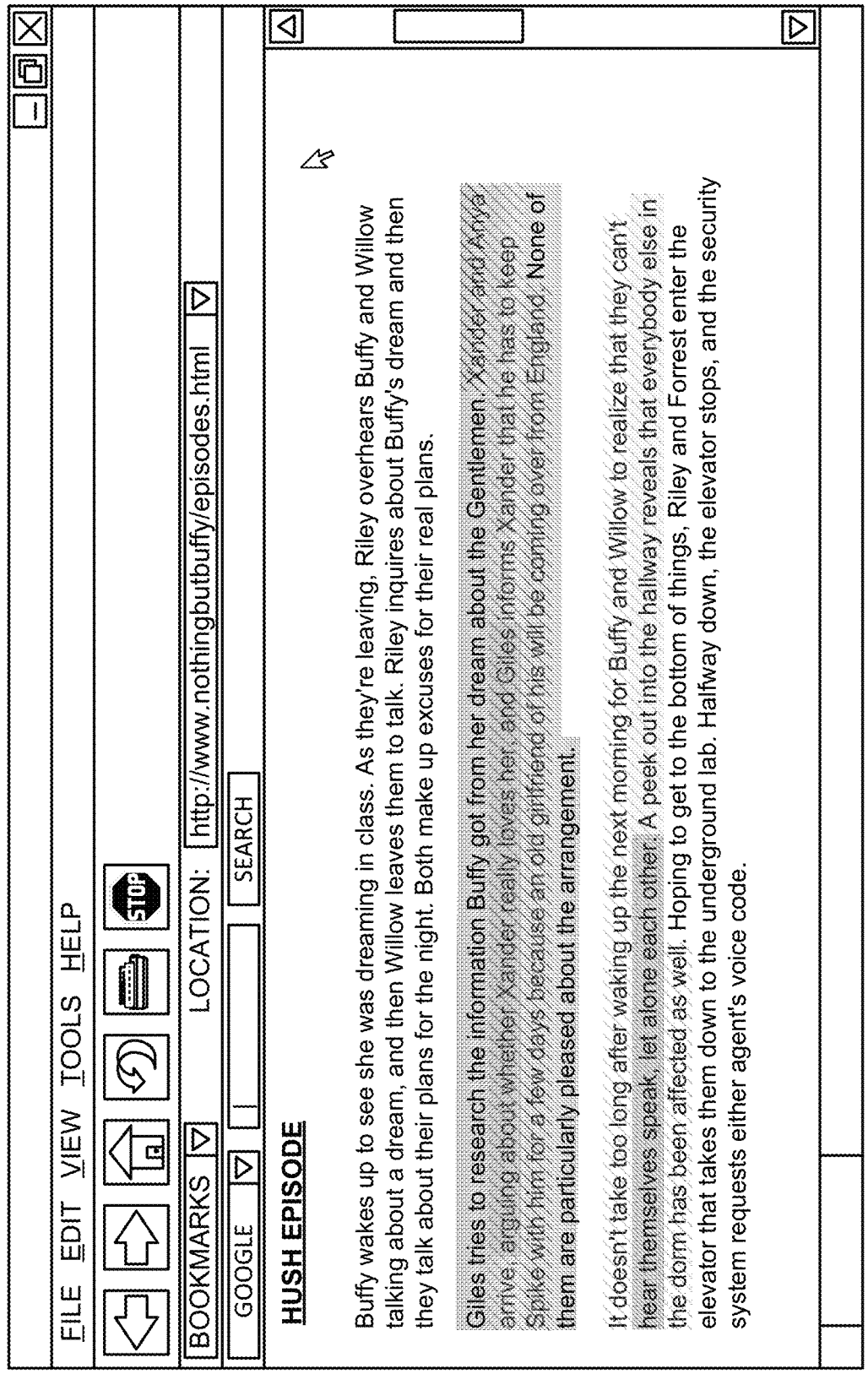
FIG. 14 is an exemplary diagram illustrating the presentation of statistics on an example document.

FIG. 13 is a flowchart of an exemplary process for determining document statistics based on highlighting of document elements. In one implementation, the processing of FIG. 13 may be performed by one or more software and/or hardware components within server 220, client 210, or a combination of server 220 and client 210. FIG. 14 is an exemplary diagram illustrating the presentation of statistics on an example document.

Processing may begin with the aggregation of highlighting information from a group of users (block 1310). For example, users of clients 210 may use highlighter tool 410 to highlight elements in documents in a manner similar to that described above with regard to FIG. 5. The highlighting information may be stored in the aggregate database of database 452. As described above, an entry in the aggregate database may include highlighting information for a document from a group of users.

Weight values may be determined for document elements based on the aggregated highlighting information (block 820). A weight value for a document element may be a function of the number of users who highlighted that element. Server 220 may generate or maintain a table for a document that identifies the weight values for the document elements, as shown in FIG. 9.

Document statistics may be generated for a document based on the aggregated highlighting information (block 1330). For example, statistics generator 458 may use the weight values for elements within a document to determine a value for each term (e.g., word or perhaps character/symbol) in the document. The document statistics may include the collection of terms and their corresponding values. The document statistics may correspond to information regarding the portion(s) of the document that users found interesting by, for example, highlighting the portion(s).

Information regarding the document statistics may be provided (block 1340). In one implementation, the information may be provided visually on a document, as hotspots, such as shown in FIG. 14. In FIG. 14, different colors (or patterns) may be used to show the different values for the terms within the document. This information may be used to improve or optimize the design of the document as an alternative to existing eye tracking techniques.

The technique described with regard to FIGS. 13 and 14 has advantages over existing eye tracking techniques. Existing eye tracking techniques typically require a lab equipped with specially designed eye tracking equipment. As a result, eye tracking techniques are complex and expensive and, thus, rarely used. By contrast, the technique described herein is very cheap because it can be implemented in software and requires no complex hardware to track users' eyes. Also, the technique described herein can be used on a large number of users (e.g., any or all users who access a particular document) instead of requiring users to visit a specially equipped lab.

CONCLUSION

Implementations described herein may permit users to easily highlight document elements. The highlighting for a document may be aggregated from a group of users, such as any or all users who access the document. The aggregated information may be used to generate or modify a snippet or summary relating to the document, or document statistics that may be used to improve or optimize the design of the document. The highlighting performed by a user, or a group of users, may be shared with another user, or another group of users, or published (e.g., similar to a RSS feed).

The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5, 7, 8, and 13, the order of the acts may be modified in other implementations. Further, non-dependent acts may be performed in parallel.

Also, exemplary user interfaces have been described with respect to FIGS. 6A-6D, 11A, 11B, 12A, 12B, and 14. In other implementations, the user interfaces may include more, fewer, or different pieces of information.

Further, it has been described that a snippet or summary may be generated or modified for a document based on highlighting of document elements. In another implementation, a snippet or summary may be generated or modified for a document based on prior highlighting of elements by a particular user. For example, if a user is presented with a snippet or summary for a document, that snippet or summary may be generated or modified based on prior highlighting of elements within the document by that user. If the user had not previously highlighted the document, then the snippet or summary may be generated or modified based on highlighting of document elements as described above.

It will be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method:
receiving (i) data identifying one or more first portions of a document highlighted by a first user, and (ii) data identifying one or more second portions of the document highlighted by a different, second user;
in response to receiving (i) the data identifying the one or more first portions of the document highlighted by the first user, and (ii) the data identifying the one or more second portions of the document highlighted by the different, second user, generating one or more weights for one or more portions of the document that were highlighted, the one or more weights indicating a number of users that highlighted the one or more portions of the document;
generating a summary that indicates the one or more weights of the one or more portions of the document that were highlighted by the first user and the different, second user; and
providing the summary to a search engine that is configured to adjust search result rankings based on the one or more weights of the one or more portions of the document that were highlighted by the first user and the different, second user as indicated by the summary.

2. The method of claim 1, wherein generating a summary that indicates the one or more weights of the one or more portions of the document that were highlighted by the first user and the different, second user comprises:
generating the summary based on the received (i) data identifying the one or more first portions of the document highlighted by the first user, and the received (ii) data identifying the one or more second portions of the document highlighted by the different, second user.

3. The method of claim 1, wherein generating a summary that indicates the one or more weights of the one or more portions of the document that were highlighted by the first user and the different, second user comprises:
including in the summary the one or more portions of the document that were highlighted by the first user and different, second user and one or more indications of a number of users that highlighted the one or more portions of the document.

4. The method of claim 1, wherein the one or more first portions of the document highlighted by the first user and the one or more second portions of the document highlighted by the different, second user do not overlap.

5. The method of claim 1, wherein the one or more first portions of the document highlighted by the first user and the one or more second portions of the document highlighted by the different, second user at least partially overlap.

6. A system comprising:
one or more computers; and
one or more storage devices storing instructions that are operable, when executed by the one or more computers, to cause the one or more computers to perform operations comprising:
receiving (i) data identifying one or more first portions of a document highlighted by a first user, and (ii) data identifying one or more second portions of the document highlighted by a different, second user;
in response to receiving (i) the data identifying the one or more first portions of the document highlighted by the first user, and (ii) the data identifying the one or more second portions of the document highlighted by the different, second user, generating one or more weights for one or more portions of the document that were highlighted, the one or more weights indicating a number of users that highlighted the one or more portions of the document;
generating a summary that indicates the one or more weights of the one or more portions of the document that were highlighted by the first user and the different, second user; and providing the summary to a search engine that is configured to adjust search result rankings based on the one or more weights of the one or more portions of the document that were highlighted by the first user and the different, second user as indicated by the summary.

7. The system of claim 6, wherein generating a summary that indicates the one or more weights of the one or more portions of the document that were highlighted by the first user and the different, second user comprises:
  generating the summary based on the received (i) data identifying the one or more first portions of the document highlighted by the first user, and the received (ii) data identifying the one or more second portions of the document highlighted by the different, second user.

8. The system of claim 6, wherein generating a summary that indicates the one or more weights of the one or more portions of the document that were highlighted by the first user and the different, second user comprises:
  including in the summary the one or more portions of the document that were highlighted by the first user and different, second user and one or more indications of a number of users that highlighted the one or more portions of the document.

9. The system of claim 6, wherein the one or more first portions of the document highlighted by the first user and the one or more second portions of the document highlighted by the different, second user do not overlap.

10. The system of claim 6, wherein the one or more first portions of the document highlighted by the first user and the one or more second portions of the document highlighted by the different, second user at least partially overlap.

11. A non-transitory computer-readable medium storing software comprising instructions executable by one or more computers which, upon such execution, cause the one or more computers to perform operations comprising:
  receiving (i) data identifying one or more first portions of a document highlighted by a first user, and (ii) data identifying one or more second portions of the document highlighted by a different, second user;
  in response to receiving (i) the data identifying the one or more first portions of the document highlighted by the first user, and (ii) the data identifying the one or more second portions of the document highlighted by the different, second user, generating one or more weights for one or more portions of the document that were highlighted, the one or more weights indicating a number of users that highlighted the one or more portions of the document;
  generating a summary that indicates the one or more weights of the one or more portions of the document that were highlighted by the first user and the different, second user; and
  providing the summary to a search engine that is configured to adjust search result rankings based on the one or more weights of the one or more portions of the document that were highlighted by the first user and the different, second user as indicated by the summary.

12. The medium of claim 11, wherein generating a summary that indicates the one or more weights of the one or more portions of the document that were highlighted by the first user and the different, second user comprises:
  generating the summary based on the received (i) data identifying the one or more first portions of the document highlighted by the first user, and the received (ii) data identifying the one or more second portions of the document highlighted by the different, second user.

13. The medium of claim 11, wherein generating a summary that indicates the one or more weights of the one or more portions of the document that were highlighted by the first user and the different, second user comprises:
  including in the summary the one or more portions of the document that were highlighted by the first user and different, second user and one or more indications of a number of users that highlighted the one or more portions of the document.

14. The medium of claim 11, wherein the one or more first portions of the document highlighted by the first user and the one or more second portions of the document highlighted by the different, second user do not overlap.

15. The medium of claim 11, wherein the one or more first portions of the document highlighted by the first user and the one or more second portions of the document highlighted by the different, second user at least partially overlap.

* * * * *